INVENTORS.
Leon J. Kazmierczak &
Frederick W. Sullivan, III
BY William Klabunde
ATTORNEY.

Feb. 16, 1960   L. J. KAZMIERCZAK ET AL   2,925,331
GAS DEFLECTOR FOR GAS-SOLIDS CONTACT APPARATUS
Filed Dec. 4, 1956   2 Sheets-Sheet 2

INVENTORS.
Leon J. Kazmierczak &
Frederick W. Sullivan, III
BY William Klabunde
ATTORNEY.

United States Patent Office 2,925,331
Patented Feb. 16, 1960

2,925,331

GAS DEFLECTOR FOR GAS-SOLIDS CONTACT APPARATUS

Leon J. Kazmierczak, Philadelphia, and Frederick W. Sullivan III, Wallingford, Pa., assignors to Houdry Process Corporation, Wilmington, Del., a corporation of Delaware Application December 4, 1956, Serial No. 626,240

6 Claims. (Cl. 23—288)

This invention relates to improvements in gas-solids contact apparatus of the type adapted to contain a fixed bed of coarse granular contact material through which gaseous material is made to flow downwardly for the purpose of carrying out a desired treatment of either the solids or the gas. More particularly the invention relates to an improved deflector for diverting gaseous material introduced at high velocity above the fixed bed, so that its velocity upon initial contact with the surface of the bed is insufficient to disrupt or displace the particles comprising the surface layer of the bed.

The invention is particularly adapted for use in certain reactors of known type commonly employed in the conversion, such as dehydrogenation, of hydrocarbons, which reactors may comprise a cylindrical treating vessel arranged horizontally and adapted to contain a supported compact bed of granular catalyst in the form of pellets or beads having a particle size in the range of about 1–15, and preferably about 2–8, millimeters in diameter.

A typical dehydrogenation unit may comprise a plurality of such reactors arranged to operate continuously on repeated cycles of reaction and regeneration, with intermediate periods for evacuation, purging and catalyst reduction, all of which may be controlled in suitable manner by conventional time-cycle control apparatus.

In such type of reactor the velocity of the incoming gas stream, particularly when air is being introduced in large quantity during the regeneration cycle, may be at such high velocity that its direct impingement against the surface of the compact bed will cause excessive turbulence and churning of the catalyst, with particles being scattered from the central to the peripheral surface regions of the bed. In order to overcome such tendency it has been a practice to place upon the surface of the compact mass of granular catalytic material a protective covering of larger-size particles of inert material, such as alumina, which may be irregular in shape or be in the form of spheres or balls up to about ¾ inch in diameter, or even larger.

The purpose of the covering layer of large-size inert material is to prevent the disruption of the catalyst mass by reason of the jet effect of the high velocity air stream directed downwardly over a small surface area of the catalyst mass. It has been found, however, that despite the protective covering of the catalyst mass with a layer of large-size inert granular material the dimensional requirements of the reactor and the volume requirements of its gas supply means are such that it is extremely difficult to introduce the incoming gas in the desired amount without the danger of exceeding tolerable velocity limits, thereby causing turbulence and disruption of the mass of granular material comprising the bed.

When the incoming gas stream is discharged downwardly through the top cylindrical wall of the reactor vessel normal to its axis and substantially midway between its ends, the region of the bed requiring maximum protection is that portion of its surface located centrally within the reactor and beneath the discharge end of the inlet nozzle. To protect such surface region of the bed, as well as the peripheral regions, various expedients, such as a system of grids and screens placed on top of the catalyst, have been employed. They have the disadvantage, however, of being complicated in design and expensive to fabricate, and they are likely to interfere or make difficult the charging and discharging of the granular particles comprising the bed during turnaround periods.

In accordance with the present invention, direct impingement upon the central surface of the bed is avoided, and relatively uniform distribution of the gas over the entire exposed surface of the bed is effected, by providing a deflector or baffle member which is supported above the surface of the bed, and spaced axially below the gas inlet. The deflector or baffle comprises a horizontal plate member, somewhat larger than the discharge diameter of the gas inlet or nozzle, provided with upturned side portions at opposite sides of the baffle which extend in a direction generally parallel to the side walls of the reactor vessel. The deflector may comprise a single horizontal plate member which deflects all of the incoming gas stream, or it may comprise a vertical series of spaced plate members, all but the lowermost of which are centrally perforated, so that the downwardly directed gas stream in passing through the openings has an equal amount of gas deflected at each level. In such arrangement each plate has upwardly extending side portions generally parallel to the sides of the vessel.

In one form of the invention the deflector comprises a rectangular plate member having upwardly extended portions along two opposite sides, such portions being parallel to the sides of the vessel. In another form of the invention the deflector comprises a vertical series of four circular plate members or disks spaced from each other about ¼ of the gas inlet diameter. The upper three disks have a central opening sized so that equal peripheral portions of the downwardly flowing gas stream will be intercepted and deflected at each level. In other words, approximately one fourth of the total gas volume is intercepted at each level. To obtain such distribution of gas flow the openings in the upper three plate members must be respectively about ⅞, ⁷⁄₁₀, and ½ of the gas inlet discharge diameter. If more or fewer perforate plate members are employed, the relative magnitude of their opening diameters will of course be different. The disks may all be of the same size or may be reduced in size as the openings get smaller.

With respect to the upturned side portions of the deflector plates, in the case of the single rectangular plate member the upturned opposite sides may suitably extend the full length of the plate member, whereas in the case of the annular plate members the upturned side portions of each circular disc or plate member is arcuate in horizontal projection and is considerably shorter than the disc diameter, preferably not more than about ⅓ the discharge diameter of the inlet pipe or nozzle.

For a fuller understanding of the invention reference may be had to the following specification and claims taken in connection with the accompanying drawing showing several forms of the invention and constituting a part of this application, in which:

Figure 1:
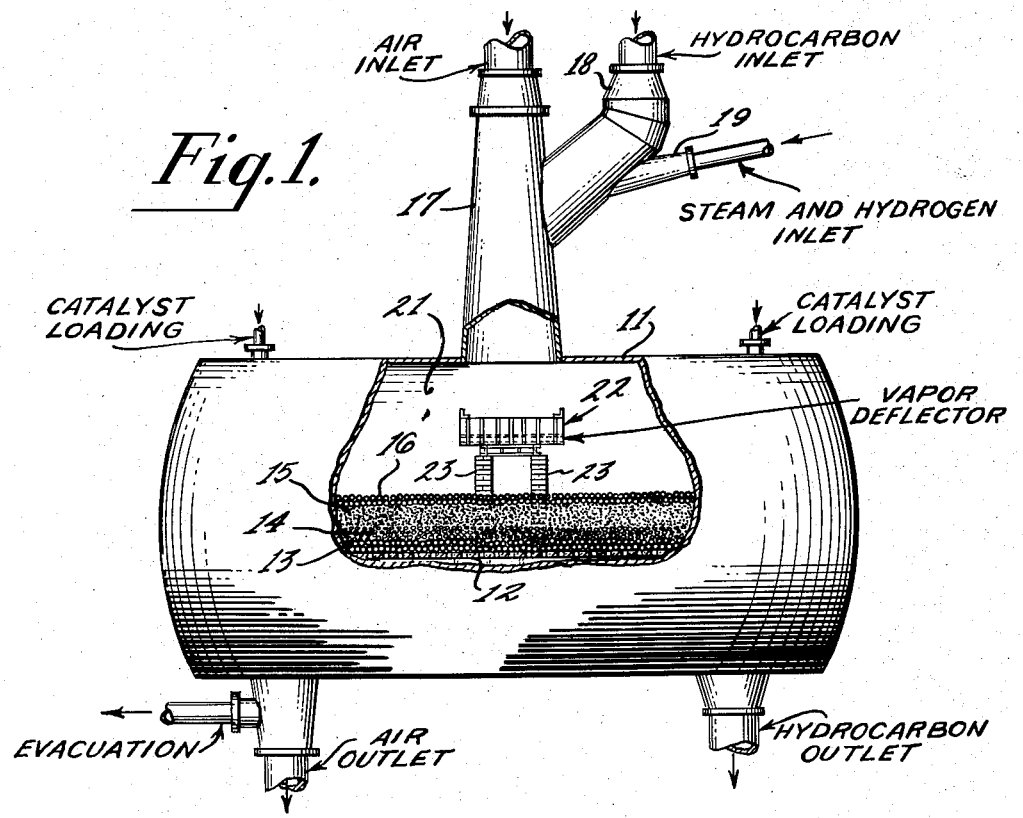
Fig. 1 is an elevation view, in partial section, of a typical cylindrical reactor provided with a single rectangular deflector.

Fig. 1 of the drawings shows a cylindrical reactor of the type to which the deflector apparatus of the present invention may be applied. For the purpose of illustrating and describing one of the various applications of the invention, a reactor vessel 11 adapted to carry out a hydrocarbon dehydrogenation reaction by passing the hydrocarbons downwardly through a fixed bed of catalytic material supported centrally within the vessel has been selected. The catalyst is periodically regenerated by discontinuing the flow of hydrocarbons, purging, and then passing air downwardly through the bed to remove by combustion the carbonaceous material deposited upon the catalyst particles during the hydrocarbon conversion reaction. Separate withdrawal of the converted hydrocarbon vapors and of the gaseous products of regeneration are effected at the bottom of the reactor vessel, as will presently be described.

The reactor vessel is not shown in great detail since, by itself, the vessel forms no part of the present invention. The side of the vessel has conveniently been broken away to clearly show the location of the catalyst bed, the arrangement of the gas deflector element and the location of the gas inlet nozzle with respect thereto.

Reactor vessel 11 is of conventional design, comprising a cylindrical body portion with dished heads closing the ends. The vessel is set in a horizontal position and arranged so that the general direction of gas flow will be normal to its axis.

The lower region of the vessel is provided with a supporting structure, such as a ceramic arch, not shown, horizontally surfaced with a layer of perforated tiles 12 extending across the entire vessel 11 at a level sufficiently below the axis thereof so that a fixed bed of catalyst of the desired depth may be provided substantially throughout the central region of the vessel.

For reasons hereinafter appearing, the catalyst is sandwiched between layers of other granular material. The bed of stratified granular material resting upon the surface of the perforated tiles 12 comprises a thin bottom layer of inert alumina balls 13 of about ½" diameter. Alumina balls 13 are larger than the perforations in the tiles 12 and are preferably of such size as to impose a minimum pressure drop for gas flow into and through the tile perforations. That is, the arrangement is such that there is a minimum of stoppage of the tile passageways by the alumina balls.

Immediately above the layer of ½" alumina balls there is a second layer of alumina balls 14 of about ¼" diameter. Above the layer 14 there is a relatively thick bed 15 of granular catalyst suitable for carrying out the desired dehydrogenation reaction. While the depth of catalyst bed 15 is substantially greater than that of the combined layers of alumina balls 13 and 14, with respect to its horizontal expanse it is a comparatively shallow bed. The catalyst bed 15 is of substantially uniform depth throughout, so that it has a flat horizontal surface. Spread upon the surface of the catalyst there is a covering layer of alumina balls 16 of about the same size as the alumina balls comprising the bottommost layer 13. The purpose of the covering layer of relatively large balls 16 is to prevent any disruption of the surface of the catalyst bed as a result of high velocity flow of the incoming gaseous material across the surface of the bed. Since the catalyst particles are not more than 15 and preferably about 2–8 millimeters in average diameter, they are incapable of withstanding high-velocity gas flow horizontally across the surface of the bed.

Gaseous material is introduced into the reactor 11 through a venturi-shaped nozzle 17 located on the top side of the vessel above its horizontal axis and substantially midway between its ends. Nozzle 17 is provided with a side branch nozzle 18 which, in turn, is provided with a branch nozzle 19. Suitable supply lines are connected to the nozzles 17, 18 and 19 so that, in predetermined and controlled sequence, air may be supplied to nozzle 17, the hydrocarbon charge to nozzle 18, and steam and hydrogen to nozzle 19. Thus, all incoming gas is eventually received by nozzle 17 and is discharged therefrom vertically downward into the upper region of reactor vessel 11. A solids-free space 21 is provided above the surface of the bed to form a gas distributing zone wherein the downwardly-directed incoming gaseous material may spread over the surface of and downwardly into the bed through the covering layer of alumina balls 16.

Since the amount of gas required for the various cycles of operation is such that the gaseous material discharging from nozzle 17 necessarily enters the reactor vessel at relatively high velocity, such as in the order of about 150–200 feet per second, any direct impingement of the incoming gas stream upon the surface of granular material located near the gas inlet would, in the absence of suitable bed stabilizing or gas deflecting means, such as wire screen covers, cause the particles of granular material to be churned about or blown from the central to the outermost surface area of the bed. To obviate such difficulty, it has been proposed that a vertical pier be erected on the central portion of the arch, extending upwardly through the granular material to a level between the surface thereof and the top of the vessel, and spaced from the discharge end of the inlet nozzle a distance sufficient to deflect the high-velocity gas stream toward the sides and ends of the vessel. It has been found, however, that while such structure may protect a small region of the bed surrounding the pier and more or less directly in the path of the incoming gas stream, it will not sufficiently protect the portions of the bed more remote from the pier. Even though the pier deflects some of the gas stream outwardly in all directions, if the horizontal velocity component of the gas stream is excessive in localized areas surrounding the pier, the solid particles may be shifted from their desired fixed position. For best results, it is obviously desirable to have a minimum of variance between the velocities of the gas entering the bed in the regions adjacent to the pier and the velocities of the gas entering the bed in the remote regions of the reactor vessel.

In order to intercept the incoming gas stream and deflect the same laterally throughout the distributing zone 21 in a manner which will provide gas velocities entering all surface portions of the bed well within the maximum allowable velocity, the deflector apparatus or element of the present invention, generally indicated by the numeral 22, is provided.

Figure 2:
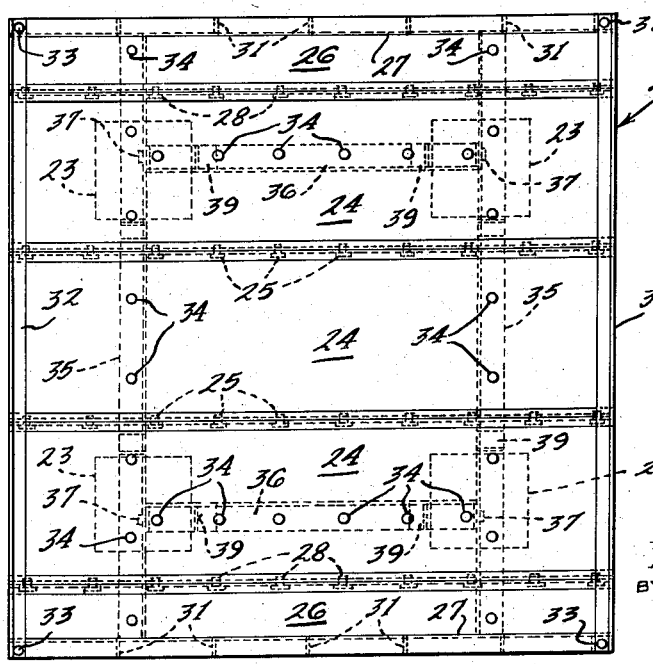
Fig. 2 is a plan view of the form of deflector channel shown in Fig. 1.
Figure 3:
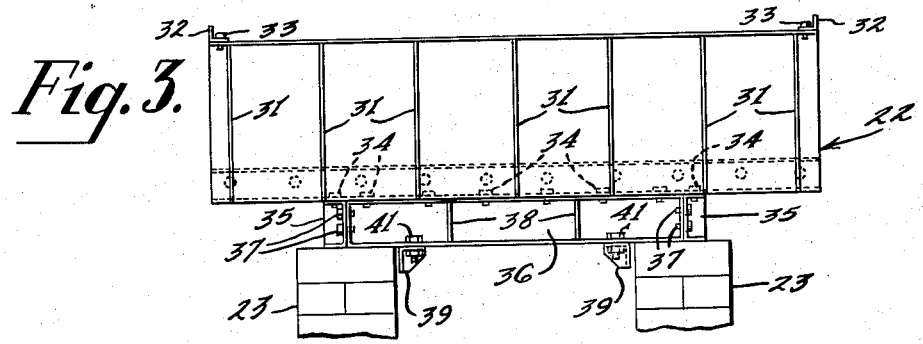
Fig. 3 is a side elevation of the deflector channel of Fig. 1.
Figure 4:
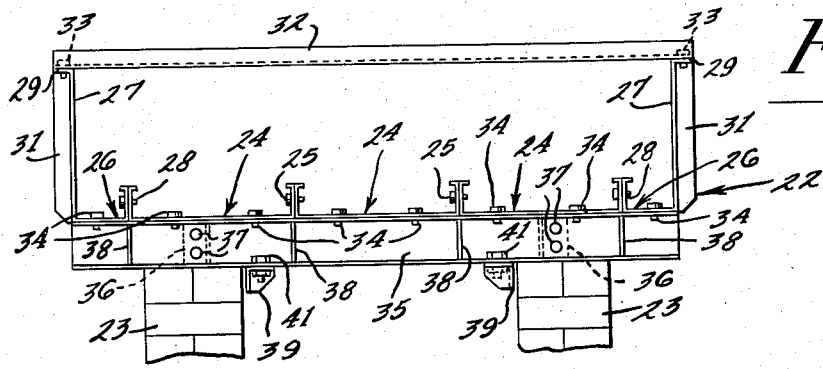
Fig. 4 is an end view of the deflector channel of Fig. 1.

The details of the rectangular gas deflector illustrated in Fig. 1 are more clearly shown in Figs. 2, 3 and 4, the deflector being fabricated of structural elements designed and assembled to provide a rigid assembly readily installed and removed from its fixed location, and designed to withstand the force of the incoming gas or vapor stream. The deflector structure is set on a group of four brickwork piers 23 extending upwardly from the bed supporting arch and located at the corners of a rectangle smaller than the over-all size of the deflector.

In its general configuration deflector 22 has the appearance of a U-shaped channel having a square base and short upturned edges along the sides which are parallel to the axis of the vessel 11.

Although deflector 22 may in its simplest form comprise a single flat plate member turned upwardly along two opposite sides so as to form a U-channel, the preferred, and illustrated, rectangular embodiment of the invention comprises a plurality of separately fabricated structural elements which are assembled and joined, as by bolts, rivets or welding, to form a unitary structure.

Deflector 22 comprises three U-channel members 24 having relatively short side portions which extend upwardly and then slightly inwardly to provide additional rigidity, as particularly shown in Fig. 4. The channel members 24 have their side members joined together by bolts 25.

Two additional channel members 26 of J-shaped cross section have low side portions which match the side portions of channels 24. The low sides of the J-members are secured by bolts 28 to the outermost side portions of the assembly of connected channel members 24. The high side portions 27 of members 26 are turned slightly outward along their upper edge so as to provide a bolting flange 29, and they are provided with vertical ribs 31 which extend the full height of side portion 27 and also extend outwardly therefrom the full width of the bolting flange 29. An elongated angle member 32 spans the assembled channel at each end so as to rigidly brace the ends of the upwardly extending side members 27. Angle member 32 is attached by bolts 33 to the top of the flange member 29.

The square, channel-shaped deflector assembly comprising the three U-channel members 24 and the two J-channel members 26 is reinforced and supported from beneath by a rectangular framework of U-channel members arranged sidewise and secured by bolts 34 to the bottom of channel members 24 and 26. The rectangular framework comprises a pair of U-channel members 35 which are open at their ends and a pair 36 which are closed at their ends. Members 35 extend entirely across the underside of the main deflector assembly transversely to its direction of run, and are located at such distance from the open ends of the deflector channel 22 that each channel member 35 may rest upon a pair of the brickwork piers 23. Extending between the channel members 35 to complete the rectangular frame are the pair of U-channel members 36 which are closed at their ends. The end portions of channel members 36 also rest on adjacent piers 23 and their ends are secured by bolts 37 to the base of channel members 35. The rectangular reinforcing framework thus formed is attached to the bottom of the deflector assembly by bolts 34. Each of channel members 35 and 36 is provided with vertical ribs 38 intermediate their ends to provide additional structural strength.

As stated, the entire deflector structure 22 rests upon the piers 23. Sidewise movement of the deflector is prevented by downwardly-projecting, short reinforced angle members 39 which are attached by bolts 41 to the bottom of channel members 35 and 36 closely adjacent to the inwardly-faced sides of piers 23. The members 39 are slightly spaced from the sides of the piers so that the entire deflector structure may readily be installed or removed.

The rectangular deflector herein described is especially suitable for use in a cylindrical reactor vessel arranged horizontally and having substantially greater length than diameter. Since the gaseous material discharging downwardly into the central region of the reactor has a shorter distance of travel to reach the surface portions of the bed along the sides of the vessel than to reach the surface portions at the ends thereof, the upturned side portions of the deflector cause the gaseous material passing over such sides to be directed more nearly horizontally toward the sides of the vessel. The gaseous material is then deflected toward the surface of the bed by the curving side walls of the reactor vessel. The gaseous material which is deflected in an axial direction toward the ends of the vessel is not deflected downwardly to the same extent by the wall surfaces of the vessel. It has been determined experimentally that the rectangular channel-type deflector provides a satisfactorily narrow range of gas velocities over and into the entire surface area of the bed which is well within the tolerable maximum.

Figure 5:
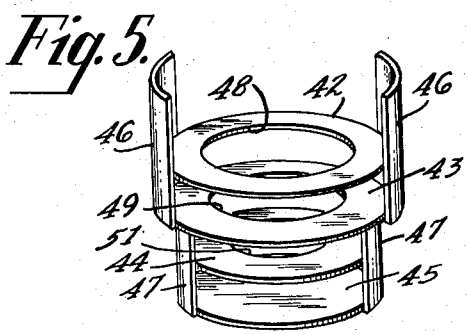
Fig. 5 shows in isometric view another form of deflector adapted to channel the flow of incoming gas axially toward the ends of the cylindrical reactor.

Fig. 5 shows in isometric view another form of deflector in accordance with the invention adapted to channel incoming gaseous material toward the ends of a cylindrical reactor such as that illustrated in Fig. 1. The deflector is of generally annular shape. In this embodiment of the invention a series of annular perforate disks are arranged in a vertical tier beneath the gas inlet nozzle, and are supported in vertically-spaced relationship by arcuate side members positioned at diametrically opposite sides of the reactor axis.

Figure 6:
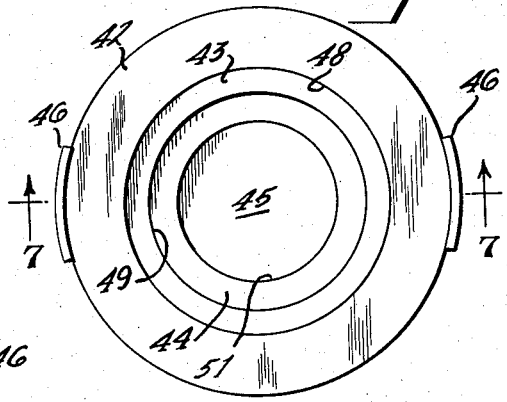
Fig. 6 is a plan view of the annular disc deflector shown in Fig. 5.
Figure 7:
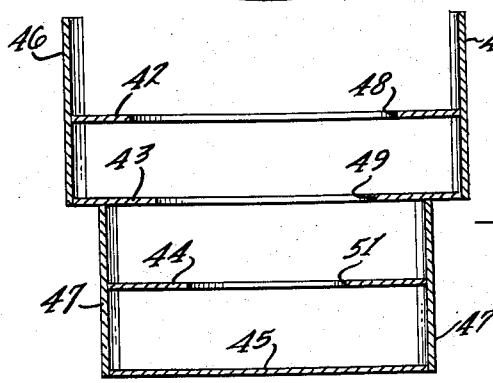
Fig. 7 is a section taken along line 7—7 of Fig. 6.

The details of the annular deflector are more clearly shown in Figs. 6 and 7. The deflector assembly comprises four annular disks equidistantly spaced one above the other. The two uppermost disks 42 and 43 have the same outer diameter, which is about 1¼ times the discharge diameter of the gas inlet, and the two lowermost disks 44 and 45 are likewise of equal outer diameter, and are about equal to such discharge diameter. This stepdown arrangement with respect to the size of the central openings and of the outer diameters of successive pairs of disks causes a stepwise deflection of the gas from vertical to horizontal flow.

A pair of vertical arcuate supporting members 46 maintain the positional relationship of uppermost disk members 42 and 43, the members 46 extending slightly above the uppermost disk 42.

A second pair of vertical arcuate support members 47 depend from the lower surface of disk 43 and support the lowermost disk members 44 and 45. Disk member 45, which forms the bottom of the deflector assembly, is imperforate and is set directly upon either a single brickwork pier or a group of piers located centrally below the gas inlet nozzle shown in Fig. 1.

The opening 43 of the uppermost perforate disk 42 is somewhat smaller than the discharge diameter of the gas inlet nozzle which discharges the stream of gas to be deflected. The opening 49 of disk 43 is somewhat smaller than opening 48, and opening 51 in disk 44 is still smaller.

In striking the uppermost disk 42 a portion of the incoming gas stream is deflected in a generally horizontal direction and channeled to some degree by the upwardly projecting ends of side members 46 toward the ends of the cylindrical vessel. Gas which flows over the top edge of members 46 toward the sides of the vessel is directed slightly upward and is then deflected downward by the curved wall of the vessel.

The gas stream then passes successively through opening 49 in disk 43 and through opening 51 in disk 44. Portions of the gas stream are deflected toward the ends of the vessel in each of the spaces between disks 42—43, 43—44 and 44—45, the gas being channeled in such directions by the side support members 46 and 47 and the flat horizontal surfaces of disks 43, 44 and 45.

The annular deflector of Figs. 5 to 7, as well as the rectangular deflector of Figs 1 to 4, may be supported either on a series of vertical piers, as shown in Figs. 1 to 4, or upon a single brickwork pier, if so desired.

In selecting the most suitable dimensions for the deflector members, and in determining the optimum positional relationship of the deflector with respect to the discharge end of the inlet nozzle and the walls of the reactor vessel, consideration must be given to the velocity of the incoming gas, the discharge diameter of the gas discharge nozzle, the over-all dimensions of the reactor, and the size of the alumina balls covering the surface of the catalyst bed.

Obviously, the maximum horizontal velocity which may be tolerated at the surface of the granular mass will depend upon the size and weight of the particles forming the protective layer 16. After the maximum allowable velocity for the particular alumina balls employed and the discharge velocity of the incoming gas stream have been determined, the size of the various elements of the deflector assembly and its positional relationship should be such as to cause the deflected gas to flow across and then downwardly into the granular mass at velocities sufficiently low in every portion of the gas distributing zone 21 so as to provide a substantial margin of safety in safeguarding against disruption of the surface bed.

In order to determine the optimum dimensions of the deflector assembly in terms of the diameter of the gas inlet nozzle, a series of experiments were carried out on test models which duplicated the essential characteristics of the rectangular deflector shown in Figs. 1 to 4 and the annular deflector shown in Figs. 5 to 7.

Inasmuch as reactor units of the type referred to herein normally operate with gas inlet velocities in the range of about 150-200 ft./sec. and at temperature and pressure conditions of about 1050-1150° F. and about 20-25 p.s.i.a., respectively, such conditions were contemplated in the design of the experimental equipment to be used in determining the relative merits of various types of gas deflector.

In order to obtain a design basis for construction of a suitable form of gas deflector or baffle a series of preliminary tests were conducted on an experimental bed of ½" diameter alumina balls having a particle density of 2.43 kgm./liter and a bulk density of 1.88 kgm./liter. The purpose was to determine the maximum gas velocities which could be tolerated at the surface of the bed without causing disruption of the surface layer and substantial displacement of the balls. It was found that a horizontal velocity of 106 ft./sec. directly over the surface of the bed was insufficient to move the balls and that a downward velocity of 123 ft./sec. barely moved the balls. It was felt that for practical purposes of design and operation the maximum allowable velocity should be figured as being roughly about half of the experimental maximum, which would provide a reasonable margin of safety.

In order to test various deflector designs, a scale model which duplicated the proportions of the distributing zone was constructed, with provision for mounting the different deflectors at suitable locations beneath the gas inlet nozzle. Velocity measuring means were installed at various locations throughout the horizontal area which would approximate the surface of the bed, although it was not necessary to actually provide a bed of granular material in order to make the necessary velocity determinations. Scale-size deflectors were constructed so as to be interchangeably mountable upon a central pier or supporting member located axially below the gas inlet nozzle. All dimensional relationships were figured in terms of the discharge diameter of the gas inlet.

The model reactor employed in testing the various types of deflector comprised a semi-cylindrical vessel arranged horizontally with its curved side uppermost. The vessel was closed at its ends and had an inlet nozzle centrally located on its cylindrical wall and an outlet nozzle at the bottom. A single pier was set on the bottom of the vessel axially below the inlet nozzle. All sizes and distances were measured in terms of inlet nozzle diameters. The model reactor had a length of 8.08 and a radius of 1.86. The flat bottom was considered to represent bed level. Provisions were made for a constant gas inlet velocity of 200 ft./sec., air being used in the experiments, and for measuring the gas velocities at various locations within the chamber.

*Test I*

A flat circular disk deflector having a diameter of 1.24 was set on top of the pier at a distance of 0.93 below the inlet nozzle and a distance of 1.475 above the theoretical surface of the bed, that is, the level at which the protective layer of alumina balls would normally repose. It was found that this deflector only partially deflected the gas stream, and that the gas flowed downwardly and outwardly off the perimeter of the disk at about 218 ft./sec. After covering approximately half the distance to the bed level the gas was flowing at a velocity of 143 ft./sec., and at the bed level the gas velocity was still excessively high.

*Test II*

A built-up rim was then formed along the perimeter of the 1.24 diameter deflector used in Test I. The rim extended upwardly a distance of 0.155, so that the distance from the top of the rim to the gas inlet nozzle was 0.775. The presence of the vertical circumferential rim caused the gas to be deflected over the sides of the deflector in a generally horizontal direction. At the rim the gas velocity was 191 ft./sec., and at the sides of the reactor where the gas was deflected downwardly the velocity was 165 ft./sec.

*Test III*

A flat circular disk having a diameter of 1.86 was then substituted for the 1.24 disks of Tests I and II, and it was found that the gas was deflected from the surface of the disk toward the ends of the reactor in a more nearly horizontal direction. The velocity at the perimeter of the disk was 200 ft./sec., and at the cylindrical wall surfaces of the reactor, where the gas was deflected downwardly toward bed level, the gas velocity was 114 ft./sec.

*Test IV*

A flat circular disk, having a diameter of 2.48 was then substituted, and placed at a distance of 0.41 from the gas inlet nozzle. This deflector also caused the gas to flow horizontally from its outer perimeter at excessively high velocity. It was found that the high velocity persisted over too great a horizontal distance, so that when it was deflected from the side and end walls of the reactor the velocity was still excessive.

*Test V*

A rectangular deflector with built-up sides was then substituted for the annular deflector. The deflector had a length of 1.86 and a width of 1.24, and the long sides were extended upwardly a distance of 0.31, thus forming a U-channel. The deflector was placed so that the built-up side portions extended parallel to the axis of the reactor. The base of the rectangular channel thus formed was located a distance of 0.93 from the gas inlet nozzle. Velocity readings were taken at various bed level locations and it was found that the maximum downward velocity of the gas at such level was 64 ft./sec.

*Test VI*

The rectangular deflector of Test V was then shortened to form a square having a length and a width of 1.24. With this modification, the maximum gas velocity at bed level was found to be 64 ft./sec.

*Test VII*

The type of rectangular deflector used in Test V was then modified by attaching a cross member at each end of the U-channel, to brace the upper corners of the side extensions. The braces extended inwardly from the ends of the channel a distance of 0.31, and extended downwardly from the top edge of the built-up sides a distance of 0.16. It was found that the braces did not effect any substantial change in the velocity pattern. The maximum velocity at bed level was again 61 ft./sec.

*Test VIII*

A multilevel annular disk deflector was then positioned beneath the gas inlet nozzle, it being necessary to lower the height of the pier which supported the deflector. The annular deflector was arranged so that its uppermost edges almost touched the curving cylindrical walls of the reactor. Counting downwardly, the first perforate disk had an outside diameter of 1.25 and an inside diameter of 0.86. The second perforate disk also had an outside diameter of 1.25, but the inside diameter was 0.71. The third perforate disk had an outside diameter of 1.04 and an inside diameter of 0.52. The fourth disk was imperforate and had a diameter of 1.04. The disks were vertically spaced from each other a distance of 0.25. The slightly curved vertical side members which supported the disks in their spaced relationship, and extended generally parallel to the sides of the reactor vessel, had a width of 0.31. The vertical side members connecting the two uppermost disks extended a distance of 0.31 above the surface of the first disk to form square side extensions. The vertical side members supporting the two lowermost disks depended from the underside of the second large disk a distance of 0.5 plus the thickness of two disks. The disks had a thickness of about 0.04. With this deflector, it was found that the maximum bed level velocity of the gas was 48 ft./sec., thus establishing its superiority, at least with respect to gas velocity reduction, over the several deflectors tested.

The bed level velocities in each of Tests I, II, III and IV were too high for the particular size alumina balls tested and, since the test balls were of a size considered to be in the practical range for commercial use, the deflectors employed in these four tests were not recommended for such use under the conditions set forth. Each of the tests V, VI, VII and VIII showed bed level velocities of roughly about one-third to one-half of what was considered to be the maximum allowable velocity. The deflectors employed in the latter tests were therefore considered to be satisfactory.

It will be noted from the data obtained in these tests that the deflectors which had opposite turned-up edges running generally parallel to the long sides of the cylindrical vessel showed a marked superiority over the other forms tested. The annular type deflector comprising multiple perforate disks proved to be the most efficient form of all. The single rectangular deflector plate with opposite turned-up edges, however, proved to be highly efficient and, in view of its simplicity of construction, was considered easier and less costly to fabricate, install, and maintain. The rectangular type deflector was therefore thought to be the most suitable design in cases where the cost factors alluded to above are of importance.

It is to be understood that the invention is not limited to the particular type of process and the particular type of reactor with which it has been identified herein for the purposes of description and explanation. In its broadest aspects the invention has application to gas-solids contacting vessels of more or less general design, but which are of such irregular dimensions that a bed of solids contained therein presents an exposed surface area of substantially greater length than width, and which receive incoming gaseous material as a downwardly-directed, high-velocity stream discharging above the surface of the bed and in such close proximity thereto that the particles comprising the surface layer tend to be churned about or otherwise displaced. The bed may be relatively deep, or may be shallow, since the invention is concerned only with bed surface stabilization.

With respect to the size and positional measurements given for the deflector in terms of the discharge diameter of the gas inlet, they appear as odd decimals merely because the model reactor and deflector were scaled in terms of inches and the measurements were then expressed in terms of gas inlet diameters.

In connection with the annular type deflector, it is not essential, though it may in some cases be desirable, that the disks or plate members be of different outer diameter, that is, that the size of the disk be decreased as the central openings become smaller.

While the invention has been shown and described in several forms, it will be obvious to those skilled in the art that it is susceptible of various other modifications and changes within the spirit of the invention, and it is desired therefore than only such limitations shall be placed thereon as are imposed by the appended claims.

What is claimed is:

1. In a gas-solids contacting vessel adapted to contain granular material as a fixed bed having an exposed surface of substantially greater length than width, said vessel having a circular gas inlet nozzle arranged to introduce gaseous material as a downwardly directed, high-velocity stream centrally above said surface of said bed and a gas outlet arranged to discharge said gaseous material after passing downwardly through said bed, the combination therewith of a gas deflector comprising a flat horizontal portion and raised side portions extending along two opposite sides thereof to form a shallow U-channel parallel to the longest horizontal axis of said surface, the base of said channel having a minimum horizontal dimension of at least about 1¼ times the discharge diameter of said inlet nozzle and being spaced axially therebelow a distance of about ⅓–1 times said diameter, and the sides of said channel having a height of about ¼–⅓ times said diameter and a length of at least about ⅓ of said diameter.

2. Apparatus as in claim 1 in which said horizontal portion of the deflector is rectangular, and in which said raised side portions are coextensive with the long sides of said horizontal portion.

3. Apparatus as in claim 2 in which said horizontal portion is a square having a side dimension of about 1¼ times said discharge diameter and is spaced from said nozzle a distance of ⅓ to 1 times said diameter, and in which the height of said side portions is about ⅓ of said diameter.

4. Apparatus as in claim 1 in which said horizontal member is a flat annular disk having a central opening smaller than the discharge opening of said inlet nozzle and said raised side portions are diametrically opposite arcuate members having a length of not more than about ⅓ of said inlet nozzle discharge diameter; and including a plurality of additional disk members axially below the first disk and forming therewith a vertical series of horizontal deflector elements at an interspacing of about ¼ of said nozzle discharge diameter, the lowermost of said additional disks being imperforate, and the intermediate disks having central openings progressively smaller than the opening in said first disk; each of said additional disks being joined to the disk next above by vertical side portions similar to said raised side portions.

5. Apparatus as in claim 4 wherein said disks are four in number, the approximate size of the disk openings, in descending order and in terms of inlet nozzle discharge diameter, being respectively ⅞, ⁷⁄₁₀ and ½.

6. Apparatus as in claim 5 wherein the two uppermost disks each have an outside diameter about 1¼ times, and the two lowermost disks each have an outside diameter about equal to, the inlet nozzle discharge diameter.

References Cited in the file of this patent

UNITED STATES PATENTS

| | | |
|---|---|---|
| 2,338,345 | Mather | Jan. 4, 1944 |
| 2,766,191 | Penick | Oct. 9, 1956 |